Figure 1:
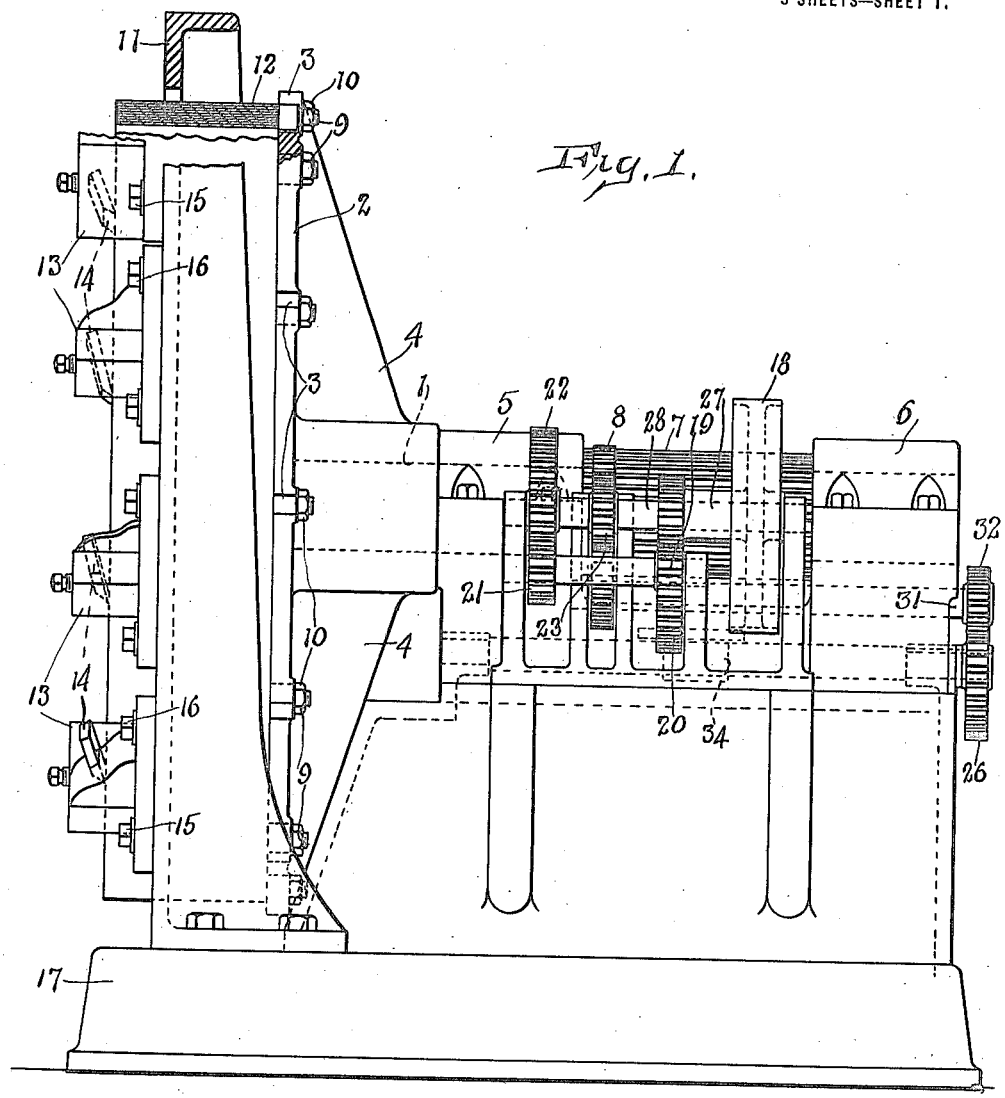

J. G. BRECKENRIDGE.
MACHINE FOR MANUFACTURING METAL WOOL.
APPLICATION FILED DEC. 9, 1916.

1,306,880.

Patented June 17, 1919.
3 SHEETS—SHEET 1.

Inventor
John G. Breckenridge

By

Attorneys

J. G. BRECKENRIDGE.
MACHINE FOR MANUFACTURING METAL WOOL.
APPLICATION FILED DEC. 9, 1916.
1,306,880.
Patented June 17, 1919.
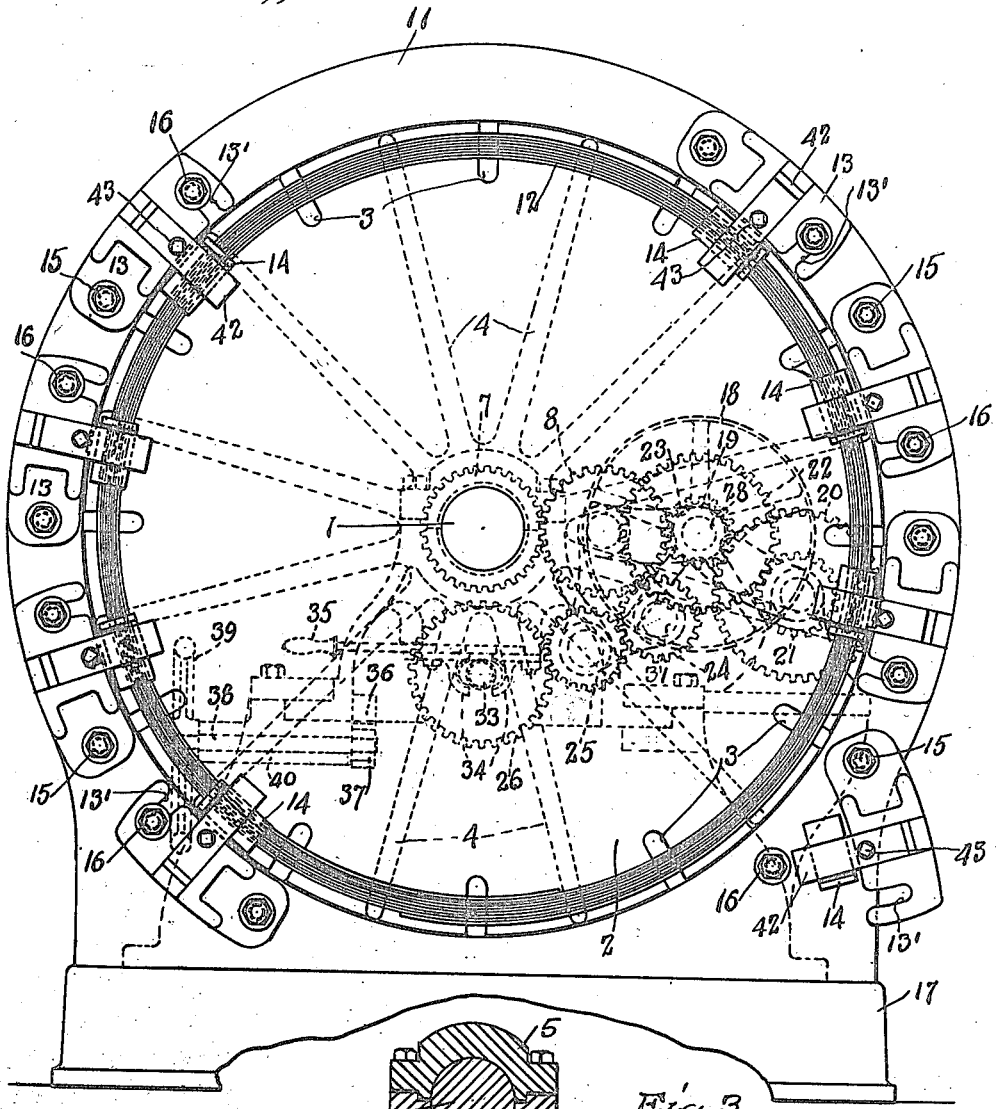
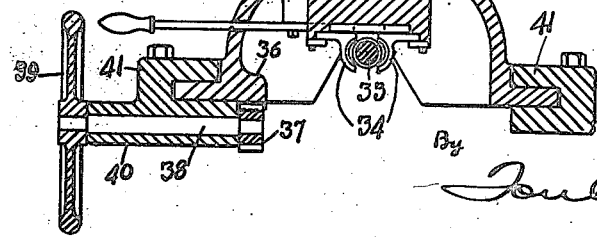
Inventor
John G. Breckenridge,

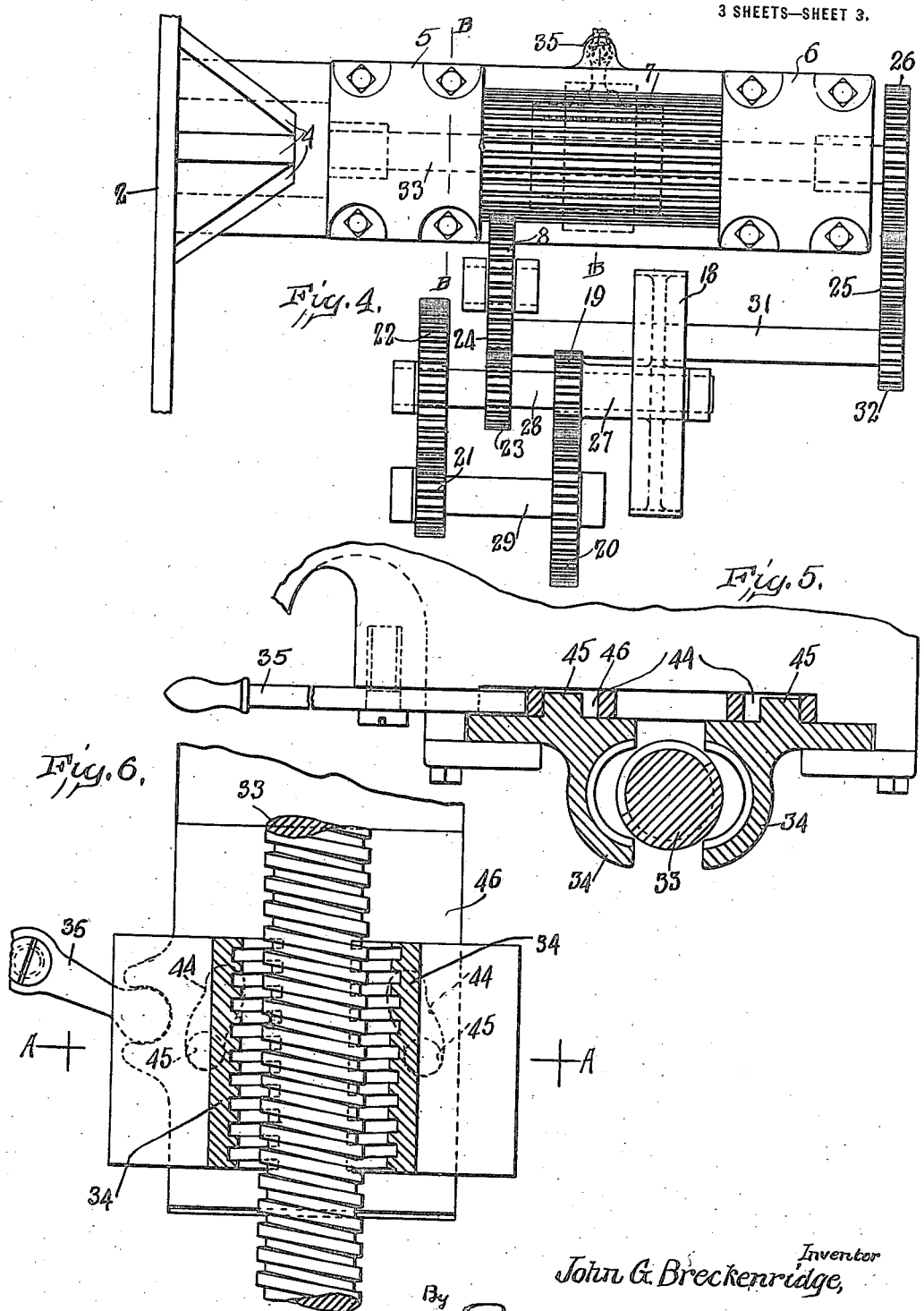

UNITED STATES PATENT OFFICE.

JOHN G. BRECKENRIDGE, OF SPRINGFIELD, OHIO.

MACHINE FOR MANUFACTURING METAL WOOL.

1,306,880.　　　　　　Specification of Letters Patent.　　Patented June 17, 1919.

Application filed December 9, 1916. Serial No. 136,065.

*To all whom it may concern:*

Be it known that I, JOHN G. BRECKENRIDGE, a citizen of the United States, residing at Springfield, in the county of Clark and State of Ohio, have invented certain new and useful Improvements in Machines for Manufacturing Metal Wool, of which the following is a specification, reference being had therein to the accompanying drawing.

My invention relates to a machine for manufacturing metal wool.

The object of my invention is to manufacture metal wool of great elasticity and sharpness in large quantities with a minimum of waste of material.

A further object is to provide a machine of sturdy construction which will produce metal wool of uniform grade requiring a small amount of manual labor for operation and adjustment. Another object of my invention is to provide a machine of such a character that it can be almost continuously operated with very few idle periods necessitated by replenishing the supply of metal to be turned into wool.

In particular it is my object to furnish a machine in which all supports, such as drums, etc., for the metal to be turned into metal wool are eliminated and the natural rigidity of the metal itself utilized, in large measure, to support it while it is being turned into wool. It is a further object to keep the cutting instruments and a drum of metal in constant, uniform engagement to secure an even cut from the metal with great rapidity.

It is an additional object to provide a novel system of gearing which will coordinate the movement of the metal and the cutters toward each other and at the same time move the metal past the cutters to produce the wool.

It is an object of my invention to produce a machine in which the cutters can be readily removed for the installation of new material or for the replacement of new cutters.

Likewise, it is my object to provide a machine in which the cutters can be adjusted readily to produce different cuts of metal at different angles according to the varying necessities of the case.

It is an additional object to provide a machine which will engage the metal and cutters continuously and uniformly until the last particle of metal is turned into wool and a machine which can then return to its initial position for a new operation with great rapidity in order that there shall be the least time lost in operation.

It is another object to provide a machine which will keep the metal and cutters in engagement uniformly, and progressively, but which can also stop this movement of the metal and cutters together very quickly in the case of any breakage or in the case of any other reason for stopping the production of the wool.

Figure 7:
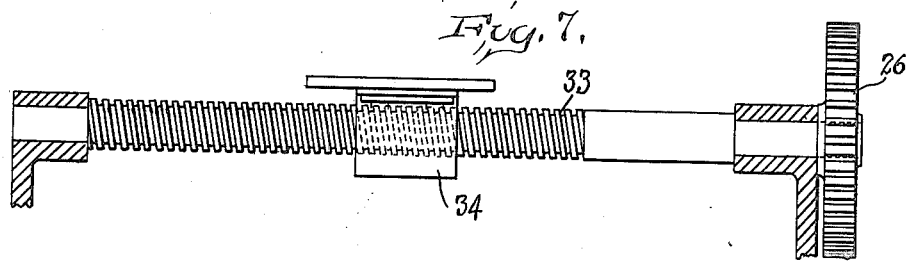

In the accompanying drawings, Figure 1 is a side elevation of my machine with the front of the machine at the left hand side of the view; Fig. 2 is an end elevation of the front of my machine; Fig. 3 is a section of the main driving shaft, its supporting mechanism, the apparatus for advancing the head on the front of the machine which carries the metal to be turned into wool, and the retreating mechanism which quickly withdraws the head back to its initial position; Fig. 4 is a top, plan view of the gearing illustrating the method of driving the main shaft; Fig. 5 is a detail section on the line A—A of Fig. 6 of the worm and jaws used to advance the head in the direction of the cutters; Fig. 6 is a bottom plan view of the worm and the movable jaws in section, together with an illustration of a portion of the lever employed to move the jaws in and out of engagement with the worm; and Fig. 7 is a side elevation of the screw.

*(Fig. 1: Side elevation of entire machine.)*

1 is the main shaft which carries at its left hand end, as appears in Fig. 1 in the drawing, the head 2 which is pierced by the openings 3, 3 and reinforced by the ribs or abutments 4, 4. This head 2 turns with the shaft 1. The shaft 1 is supported in bearings 5 and 6. It carries throughout its length between the bearings 5 and 6 the gear 7 with which a gear 8 meshes.

The head 2 carries the band or bands of metal to be turned into metal wool which bands are customarily concentrically wound around one upon another with the bolts 9, 9 welded to one edge electrically or by some other well known means. These bolts are inserted in the apertures 3, 3 and their threaded ends carry the nuts 10, thus bolting the band or bands of metal at right angles to the major plane of the head 2. A hood 11 carries the cutter blocks which in turn support the cutters. This hood 11 surrounds the drum of metal carried by the head 2. This drum of metal is designated as 12 in Fig. 1.

There is sufficient clearance between parts 11 and 12 and 2 to permit 12 and 2 to revolve freely with relation to 11 which is stationary. 13, 13 designate cutter blocks which support the cutters 14, 14. 15 designates the bolt which fastens the cutter block 13 to the stationary member 11. 16 designates the bolt which also attaches the cutter block at its other end to the stationary member 11, but the cutter block is adapted to be moved away from 16 without removing it from 11, as will be more clearly seen in Fig. 2.

17 is the base upon which 11 is mounted and which carries the bearings 5 and 6 supporting the shaft 1 and accompanying mechanism.

19, 20, 21, 22, 23 and 8 constitute the gears utilized in driving the shaft 1 through the gear 7. Power is transmitted to this train of gearing through the pulley 18 to the gear 19 joined by the collar 27 turning on the shaft 28. 19 meshes with 20 carried by the shaft 29 to which is fixed the gear 21 on the same shaft 29. 21 meshes with 22. 22 and 23 are fixed to the same shaft 28. 23 meshes with 8 and 8 meshes with 7. As 7 progresses toward the left hand of the figure, 8 remains in engagement with it at all times.

(*Fig. 2: End view.*)

In this Fig. 2, 4 indicates the arms of the spider which constitutes the head 2. 21, 22, 23, 8, 7, 24, 25 and 26 represent gearing which is more fully and clearly explained in the description of Fig. 4. 33 is the worm upon which is mounted the gear 26. 34, 34 designate the jaws which are brought into engagement with the worm to advance the head carrying the drum of metal. 35 is the handle which operates the jaws 34, bringing them into engagement or withdrawing them. 36 is the rack and 37 the pinion mounted on the shaft 38 operated by the hand wheel 39 carried in a bearing 40 which provides a means of rapidly retreating the head and the accompanying mechanism. 41 serves as a guide to keep the pinion and rack 37 and 36, respectively, in proper alinement and engagement. Around the periphery of the support 11 are arranged the cutter blocks 13, 13, as will be clearly seen in this Fig. 2. These cutter blocks are pivoted on the bolts 15 and engage the bolt 16 by means of slotted apertures 13' so that the cutter supports or blocks can be swung out of the way very readily when it is necessary to replace the metal or the cutters or to otherwise adjust the mechanism. At the lower right hand corner one of the cutter blocks is shown thrown out of its normal position so that the knife will not engage the metal. These cutter blocks are provided with arms 42 which carry the cutters proper 14. The arm 42 is bolted to the cutter block by a bolt 43.

(*Fig. 3: Section of Fig. 4 on the line B—B.*)

1 is the main shaft turning in the bearing 5. 34 and 33 are the jaw and worm respectively which serve to advance the head and the accompanying mechanism. The mechanism to rapidly retreat the head is also illustrated as in Fig. 2, but more in detail.

(*Fig. 4: Plan view of gearing.*)

In this figure the power is transmitted to the pulley 18 through the collar 27 to the gear 19, all of which turn on the shaft 28. The power is then transmitted through 20 to 29, through 21 over to 22, then to 23, thence to 8 and then to 7 to impart rotary motion to the head. 8 meshes with 24 (shown clearly in Fig. 2), which gear is fixed to the shaft 31. 31 operates 32 which is hidden behind 24 in Fig. 2, but shown in Fig. 4. 32 engages the gear 25 which in turn engages 26 which is mounted on the worm shaft 33 and operates it.

(*Fig. 5: A section on the line A—A of Fig. 6.*)

In Fig. 5, 34 34 represent the jaws engaging with the worm 33, but shown in this figure as disengaged. 44 designates the slots in which the pins 45 travel. 44, 44 are slots in the plate 46. This plate and accompanying jaws 34 are operated by the lever 35 either into engagement or out of engagement with the worm 33. (The lever 35 is shown in Fig. 6.)

(*Fig. 6: Bottom plan view of removable jaws in section.*)

46 indicate the plate attached to the jaws 34, 34. 35 is the lever operating the foregoing. 33 is the worm. 45 designates the pins which travel in the slots 44.

(*Fig. 7: Side elevation of worm.*)

Fig. 7 illustrates the worm shaft with the bearings carrying each end of the worm in section. One of the jaws which engage the worm is shown in elevation.

33 is the worm, 34 is one of the jaws, and 26 is a gear which operates the worm shaft 33.

*Operation.*

The operation of this machine is as follows. The metal bands are concentrically wound forming the drum of metal 12, the bolts 9 are welded to one edge. The drum of metal with the bolts is then placed against the head and the bolts inserted in the apertures 3 in the head of the spider 2. The metal drum is then securely clamped to this head by the nuts 10. The cutter blocks 13 are swung into position and the bolts 16 tightened so that the cutters 14, 14 are held rigidly in position to cut the edge of the metal bands. The operator then brings the handle 35 into such a position that the jaws 34, 34 engage the worm 33. This imparts a forward motion to the head and to the metal drum so that the metal is advanced against the cutters while at the same time power is transmitted, as explained above, from the pulley 18 through the gearing to the main shaft 1 which revolves the metal drum past the cutters.

Thus, the metal is advanced against the cutters at a uniform rate by mechanism which keeps in harmony both the revolution of the metal and the advancing of it against the cutters. Upon the complete transformation of the metal bands into metal fibers known as metal wool, the worm is released from engagement with the jaws and the retreating mechanism is thrown into operation by the revolution of the hand wheel 39 which draws the spider head backward to its initial position.

It will be seen that the principle of the invention is to have a plurality of cutters mounted on a rigid and stationary frame and to advance the strips of metal wool very gradually against all of these cutters. That is, the bodily movement of the strips of metal as distinguished from their rotary movement is at right angles to the plane including all the cutters.

In the prior art devices are shown whereby the metal wool may be rotated and have cutters gradually advanced toward the edge of the strip of metal. The present invention improves the prior constructions by moving the metal against the cutters and thereby being able to mount the cutters in a very rigid and heavy frame.

Metal wool as commercially made is composed of extremely small shavings having a size of one or two one-thousandths of an inch. Thus to cut such extremely small shavings with accuracy the machine must be very rigid and an equal accuracy of movement of the parts must be given. If the cutters are all mounted in a rigid stationary frame they may readily be kept absolutely in the same plane and then the accurate movement of the metal strips which will carry it against the cutters may depend on the axial movement of a large and stiff carrying shaft. On the other hand, if the cutters are separately mounted on movable devices controlled, for example, by screws, then it is substantially impossible to make the movement of the cutters exactly equal to each other and at the same time accurate enough to cause the extremely small shavings of wool to be properly cut.

While I have shown and described one embodiment of my invention it will be understood that the same has been chosen for the purposes of illustration, and that I do not desire to be limited to the details of construction shown and described except as defined in the appended claims, for obvious modifications will occur to a person skilled in the art.

Having thus fully described my invention, what I claim as new and desire to secure by Letters Patent, is:

1. In a machine for making metal wool, the combination with a circular head to which a drum of metal may be attached, of a shaft on which said head is mounted, means for rotating said shaft and head, means for giving said shaft and head a slow axial movement, a circular stationary member, a plurality of cutters mounted thereon coaxial with said shaft, spaced and positioned to engage the edge of the drum of metal.

2. In a machine for making metal wool, the combination, with a circular head to which a drum of metal may be attached, of means for rotating said head and for giving it a slow axial movement, a stationary member positioned parallel to said head, and toward which said head is given its slow axial movement, and a plurality of cutters spaced around said stationary member, and positioned to engage the edge of the drum of metal.

3. In a machine for making metal wool, the combination, with a circular head to which a drum of metal may be attached, of means for rotating said head, devices, including reducing gearing constructed to give said drum a slow movement bodily in the line of its center of rotation, a stationary member positioned parallel to said head and toward which said head is bodily moved by said reducing gearing, and a plurality of cutters spaced circularly around said member, and against which the drum of metal is fed.

4. In a machine for making metal wool, the combination, with a circular head to which a drum of metal may be attached, of means, including a wide gear and a shaft to which said drum is fast, for rotating said head, reducing gearing constructed to give said shaft and said head a slow axial movement as they are rotated, hand operated devices for giving said shaft and head a rapid axial movement irrespective of their rotation, a stationary member parallel to said head and toward which said head is bodily moved, and a plurality of cutters spaced circularly around said head and against which the metal drum is fed.

5. In a machine for making metal wool, the combination, with a circular head having bolt holes, and bolts passing through said holes and serving to hold a drum of metal firmly against said head, of means for rotating said head and also for giving it a slow axial movement, a circular stationary plate, parallel to the head and toward which said head is given the axial movement, a plurality of cutter blades spaced circularly around said plate, and against which the drum of metal is moved, and bolts adjustably holding said cutters in place on said plate.

6. In a machine for making metal wool, the combination, with a spider head on which metal bands are concentrically wound, of bolts attached to one edge of said bands, and means to secure said bolts to said spider head, whereby said bands and said spider head may move together as a unit.

7. In a machine for making metal wool, the combination, with a spider head on which metal bands are concentrically wound, of bolts welded to one edge of said bands, and means for forcing said bands firmly against said spider head, said bolts passing through holes in said head and engaging said means.

8. In a machine for making metal wool, a band of metal wound concentrically to form a drum, and bolts attached to one edge of said drum.

9. In a machine for making metal wool, the combination, with a stationary circular plate, of cutter supporting plates having each a pivoting hole and an adjusting slot, bolts carried by said circular plate, passing through said holes in said supporting plate, locking bolts adapted to pass through the slots in said supporting plates, and cutters adjustably carried by said supporting plate.

10. In a machine for making metal wool, the combination, with a circular head having bolt holes passing therethrough in a circle, and bolts welded to the edge of a concentrically wound metal band, and passing through said holes, means for rotating said head and said band, devices for giving said head and band a slow movement along its axis of rotation, a circular stationary plate, parallel to said head and toward which said head is given its axial movement, cutter supporting plates pivotally carried on said stationary plate, and cutters adjustably mounted on said supporting plate and into contact with which said metal band is carried by the axial movement of said head.

In testimony whereof, I affix my signature.

JOHN G. BRECKENRIDGE.